United States Patent [19]

Tokura

[11] Patent Number: 5,299,270
[45] Date of Patent: Mar. 29, 1994

[54] METHOD AND APPARATUS FOR SIMULTANEOUS MATCHING OF DISPLACED IMAGE BLOCKS TO A REFERENCE

[75] Inventor: Nobufumi Tokura, Fukuoka, Japan

[73] Assignee: Matsushita Electric Industrial Co., Ltd., Osaka, Japan

[21] Appl. No.: 911,387

[22] Filed: Jul. 13, 1992

Related U.S. Application Data

[63] Continuation of Ser. No. 680,184, Apr. 3, 1991.

[30] Foreign Application Priority Data

Apr. 5, 1990 [JP] Japan ................................ 2-90847

[51] Int. Cl.⁵ .............................................. G06K 9/00
[52] U.S. Cl. ............................................ 382/30; 382/48
[58] Field of Search ................. 382/34, 48, 30, 33

[56] References Cited

U.S. PATENT DOCUMENTS

| | | | |
|---|---|---|---|
| 4,119,946 | 10/1978 | Taylor | 382/34 |
| 4,244,029 | 1/1981 | Hogan et al. | 382/42 |
| 4,641,350 | 2/1987 | Bunn | 382/34 |
| 4,803,734 | 2/1989 | Orishi et al. | 382/34 |
| 4,864,629 | 9/1989 | Deering | 382/42 |

*Primary Examiner*—David K. Moore
*Attorney, Agent, or Firm*—Lowe, Price, LeBlanc & Becker

[57] ABSTRACT

A pattern matching apparatus comprises a camera for observing an object to be detected, an image memory for storing data of a plurality of pixels input to the camera as unit date by deviating, or shifting overlapping unit data by one unit pixel in successive addresses, a reference pattern memory for storing data of a plurality of pixels of a reference pattern as unit data in successive addresses, and a matching circuit for simultaneously matching the unit data stored in the image memory to the unit data stored in the reference pattern memory. The unit data of addresses of the image memory are matched to the unit data of corresponding addresses of the reference pattern memory by the matching circuit.

14 Claims, 6 Drawing Sheets

METHOD AND APPARATUS FOR SIMULTANEOUS MATCHING OF DISPLACED IMAGE BLOCKS TO A REFERENCE

This application is a continuation of application Ser. No. 07/680,184 filed Apr. 3, 1991.

BACKGROUND OF THE INVENTION

1. Field of the Invention

This invention relates to a pattern matching and a pattern matching method and, more particularly, to means for calculating the degree of matching of image data to data of a reference pattern by comparing the image data input to a camera with the data of the reference pattern.

2. Description of the Prior Art

A conventional pattern matching for detecting the position of an object to be detected such as an electrical component placed on a substrate and recognizing the shape of the electrical component has been performed by storing data of pixels of an image input to a camera in an image memory as black and white binary data or multi-valued data and matching the stored data to the data of the pixels of a reference pattern stored in advance in the memory one by one.

However, since the above-mentioned conventional means matches one by one the data of the pixels of the image with the data of the pixel of the reference pattern, there arises a problem that a great deal of processing time is required.

SUMMARY OF THE INVENTION

Accordingly, an object of this invention is to proide pattern matching means capable of largely shortening a processing time.

In order to achieve this and other objects according to the present invention, there is provided a pattern matching apparatus comprising a camera for observing an object to be detected, an image memory for storing data of a plurality of pixels input to said camera as unit data by deviating the unit data by one unit pixel in addresses, a reference pattern memory for storing data of a plurality of pixels of a reference pattern as unit data in addresses, and a matching circuit for simultaneously matching said unit data stored in said image memory to the unit data stored in said reference pattern memory.

With the arrangement described above, the data of the plurality of pixels of the image as unit data are deviated by a unit pixel, and stored in the addresses of the image memory. Therefore, the data can be simultaneously matched to the addresses of the reference pattern memory, thereby largely shortening its processing time.

These and other objects and features of the present invention will become apparent from the following detailed description in conjunction with the attached drawings.

DESCRIPTION OF THE PREFERRED EMBODIMENT

An embodiment of the present invention will now be described with reference to the accompanying drawings.

Figure 1:
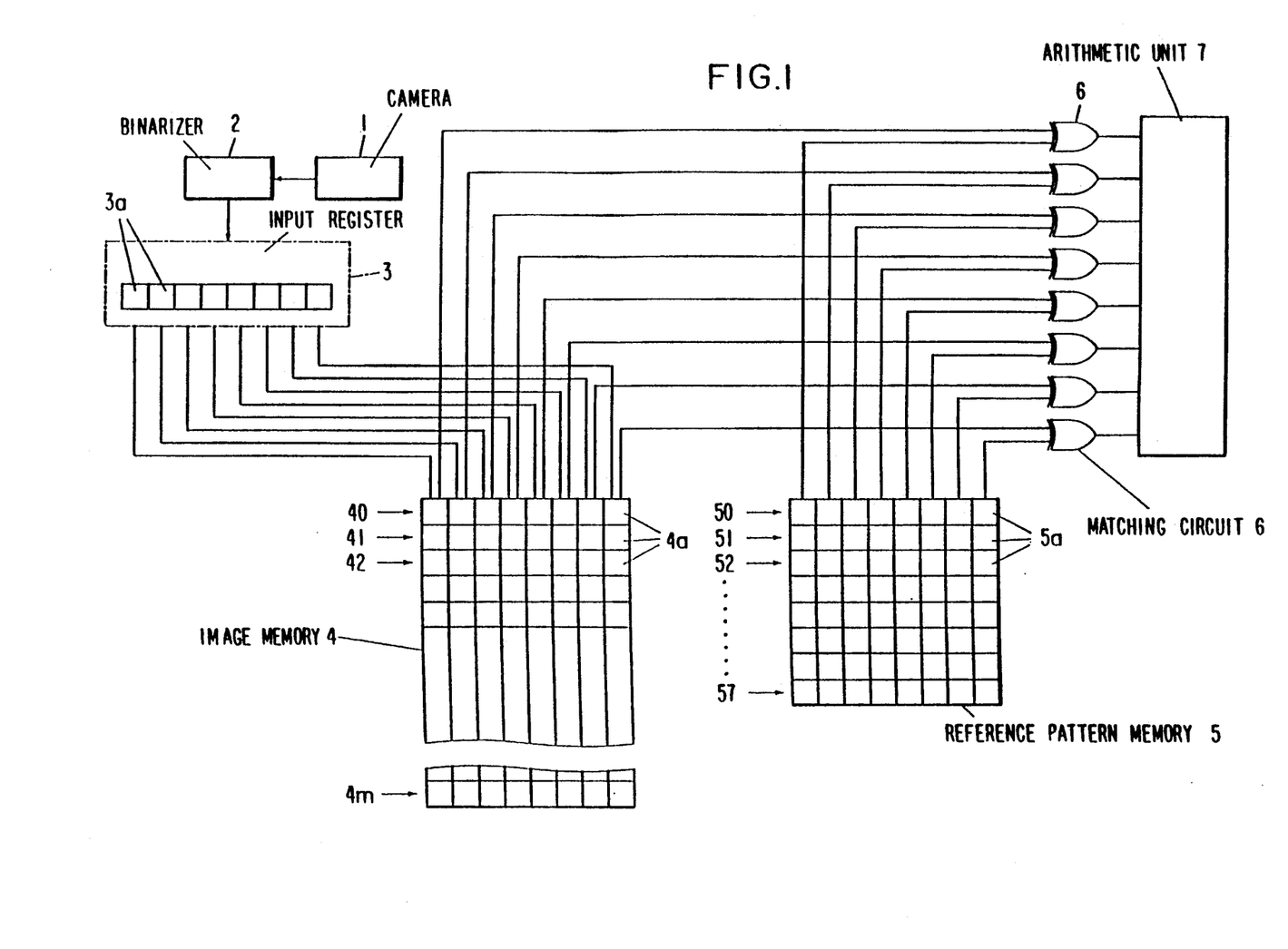
FIG. 1 is a block diagram showing pattern matching means according to an embodiment of the present invention.

FIG. 1 is a block diagram of an electrical circuit of an embodiment of matching means according to the present invention. The matching means comprises a camera 1 for observing an object to be detected, a binarizer 2 for binarizing data of pixels of an image input to the camera 1 to black and white data, an input register 3 connected to the binarizer 2, an image memory 4 formed of a RAM, a reference pattern memory 5 formed of a ROM, a plurality of matching circuits 6 formed of exclusive OR circuits, and an arithmetic unit 7. The plurality of (eight in this embodiment) matching circuits 6 are connected in parallel with the arithmetic unit 7 to simultaneously match data of eight pixels with data of a reference pattern.

The input register 3 has eight input units 3a. The image memory 4 has a number of addresses 40, 41, 42, . . . , 4m. Each of the addresses 40—4m has eight memory areas 4a corresponding to the number of the addresses, and temporarily stores the data of eight pixels of the image input to the camera 1 in the respective memory areas 4a as unit data. The reference pattern memory 5 has eight addresses 50-57. Each of the addresses 50-57 has eight memory areas 5a, and stores the data of eight pixels input to the camera 1 in the respective memory areas 5a as unit data. The memory areas 4a and 5a of the addresses 40—4m and 50-57 are respectively connected to the input units of the matching circuits 6.

A pattern matching method by the matching means described above will be described.

Figure 2A:
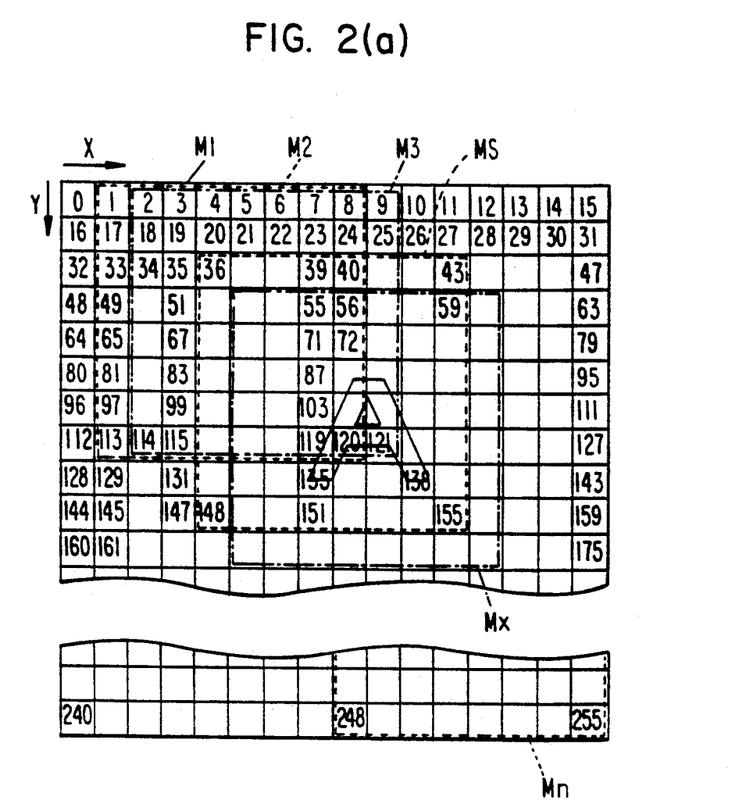
FIGS. 2(a) to 2(c) are views of image data and data of reference pattern to be processed in the embodiment.

FIG. 2(a) shows image data input to the camera 1. The image input to the camera 1 has 16×16=256 of pixels, and each pixel is referenced by a code of 0-255. The camera 1 observes a character A of an object to be detected, and detects the position and shape of the character A of the object to be detected by matching the character A to a character A of a reference pattern stored in advance in the reference pattern memory 5 shown in FIG. 2(c). The reference pattern memory 5 stores data of pixels of 8×8=64, and the memory areas 5a of the reference pattern memory 5 are referenced by codes of 0-63.

Figure 2B:
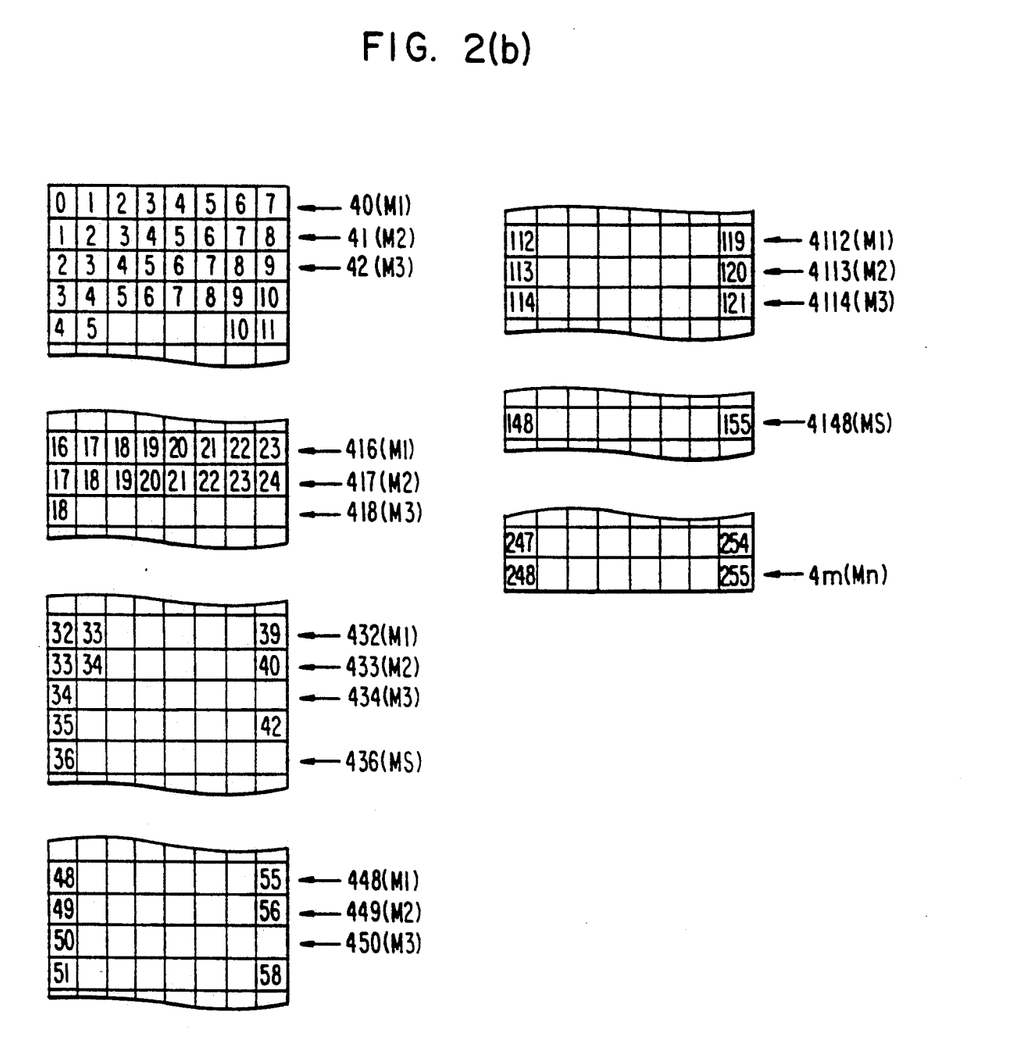
Figure 2C:
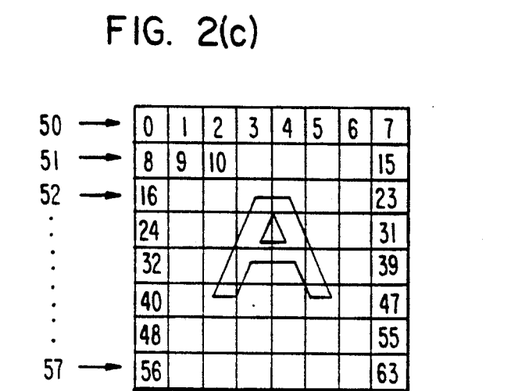

FIG. 2(b) shows data of image input to the memory areas 4a of the addresses 40—4m of the image memory 4 through the input register 3. As shown in FIG. 2(b), the data of the pixels 0-7 of the image data shown in FIG. 2(a) input to the camera 1 are input as unit data to the memory areas 4a of the first address 40 of the image memory 4. Similarly, the data of the pixels 1-8 are input as unit data to the second address 41, and the data of the pixels 2-9 are input as unit data to the third address 42. More specifically, the successive unit data pixels shifted, or deviated from one another by one pixel, are stored in the successive respective addresses 40-4m of the image memory 4, with successive addresses storing data of a particular pixel having a particular reference code in adjacent areas. Thus, as seen in FIG. 2(b), the pixel having reference code 2 is stored in the third area of the first unit data in address 40, in the second area of the second unit data stored in address 41, and in the first area of the third unit data stored at address 42. Moreover, it is also seen that the unit data in addresses 40 and 41 overlap each other by storing the overlapped group of pixels 1-7. Similarly, the unit data in addresses 41 and 42 overlap each other by storing the overlapped group of pixels 2-8. The unit data in addresses 40, 41, and 42 have a common overlap of the overlapped group of pixels 2-7. Therefore, in FIG. 2(a), the data of inspection area Me including the pixels referenced by codes of 0-119 indicted by thick lines are stored in the addresses 40, 416, 432, ..., 4112 in area M2 including the pixels referenced by codes, the data of inspection area M2 including the pixels referenced by codes of 1-120 indicated by broken lines are stored in the addresses 41, 417, 433, ..., 4113, and the data of inspection area M2 including the pixels referenced by codes of 2-121 indicated by dotted chain lines are stored in the addresses 42, 418, 434, ..., 4114. Therefore, in order to call the data of the area M1, call pulses may be input to the addresses 40, 416, 432, ..., 4112. In order to call the data of the area M2, the data of the addresses 41, 417, 433, ..., 4113 may be similarly called. In other words, in order to match the data of the various inspection areas M of the image data to the data of the reference pattern memory 5, the unit data of the addresses of the inspection areas Mi may be simultaneously, rather than sequentially, matched to the unit data of the addresses of the reference pattern memory 5. Therefore, since the unit data of the inspection areas Mi of the image data can be pattern matched eight times to the reference pattern, the processing time for the image data stored in image memory 4 can be largely shortened. In view of conventional means, since the data of the inspection areas Mi are matched to the data of the reference pattern memory sequentially one pixel at a time, the number of matching times increases up to 8×8=64 times. Thus, the conventional matching means requires a processing time eight times as long as that of the means of the present invention. Then, a pattern matching method will be described.

In order to pattern match the data of the image input to the camera 1 to the data of the reference pattern memory 5, in FIG. 2(a), the data of the inspection area M1 surrounded by thick lines are first compared with the data of the reference pattern memory 5. That is, call pulses are input to the memories 4 and 5, and the data of the address 40 are simultaneously matched to the unit data of the eight pixel data of the address 50 by the matching circuit 6. When the inputs of the matching circuit 6 are all "0", "0" or "1", "1", the outputs are "0". When the inputs of the matching circuit 6 are "1", "0" or "0", "1", the outputs are "1". The results are calculated by the arithmetic unit 7. Thus, when the first addresses 40, 50 are completely matched, the following addresses 416, 51 and 432, 52, 4112, 57 are subsequently matched, and the degree of matching is calculated by the arithmetic unit 7. The degree of matching is obtained as a matching rate, the number of matched pixels.

When the matching of the inspection area M1 is finished as described above, the inspection area M is shifted or deviated by one pixel in an X direction, and next inspection area M2 is similarly matched. The inspection area M2 is matched by matching the addresses 41, 417, ..., 4113 to the addresses 50-57.

As described above, when all the inspection areas M1-Mn are completely matched, the position of the character A of the object to be detected can be detected by obtaining the area of best matching (e.g., area Mx).

FIGS. 3(a), 3(b) and 3(c) and FIGS. 4(a) and 4(b) explain more easily a matching method with an example of an inspection area M1.

Figures 3A, 3B:
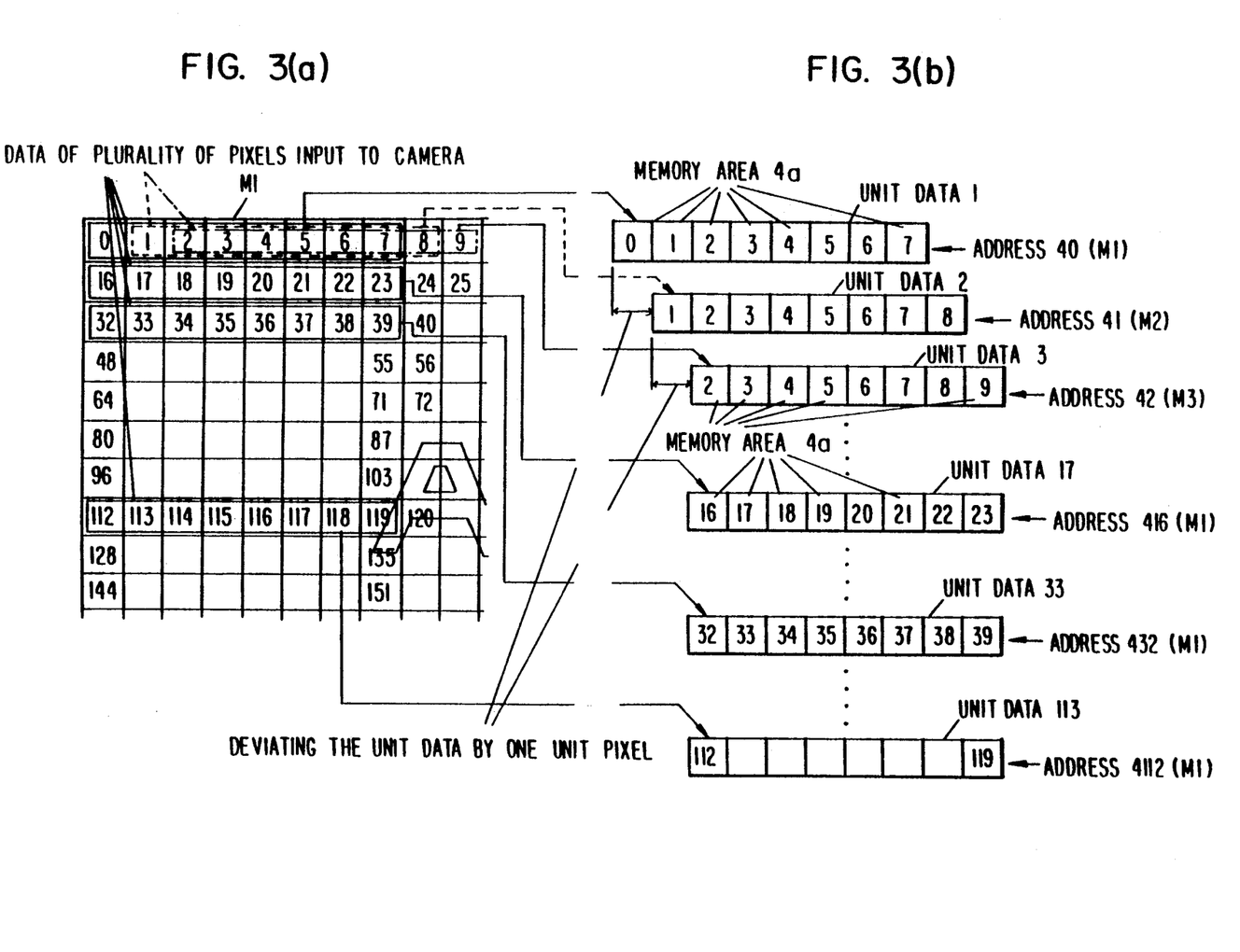
FIGS. 3(a) to 3(c) and 4(a) to 4(b) illustrate an example useful in understanding operation of the invention.

As shown in FIGS. 3(a) and (b), image memory 4 stores, as unit data in addresses 40 to 4m, data groups each including a plurality of pixels (picture elements) of the image inputted via the camera 1. As hereinabove described, the data is stored in a sequence wherein the unit data stored in one address of image memory 4 includes a sequence of pixels which are deviated by one pixel form the same sequence included in a unit data stored in an adjacent memory address.

That is, any one address of image memory 4 has eight memory areas 4a and therefore one address stores, as a unit data, eight pixels form the camera 1. In addition, as shown in FIGs. 2(b) and 3(b), the unit data stored in successive ones of the address 40 to 4m of the image memory 4 include an overlap in the sequence of pixels thereof. As seen in the drawing, the overlapping sequence of pixels is stored in a group of memory areas of one memory address which has a one memory area deviation (i.e., a one pixel deviation) from the corresponding memory areas of an adjacent memory address.

In other words, a first address 40 stores, as unit data 1, the data of the pixels 0 to 7 in the inspection area M1. A second address 41 stores, as unit data 2, the data of the pixels 1 to 8 by deviating the unit data by one pixel. thus, pixels 1-7, which are stored in memory areas 1-7 of address 40, are stored in memory areas 0-6 of address 41. Similarly, the third and following address 42 to 4m store the data of the pixels 2-9, ..., 248-255 as the unit data 3 to 113 (see also FIG. 2(b)), with one pixel deviation of the respective unit data as described above.

Figure 3C:
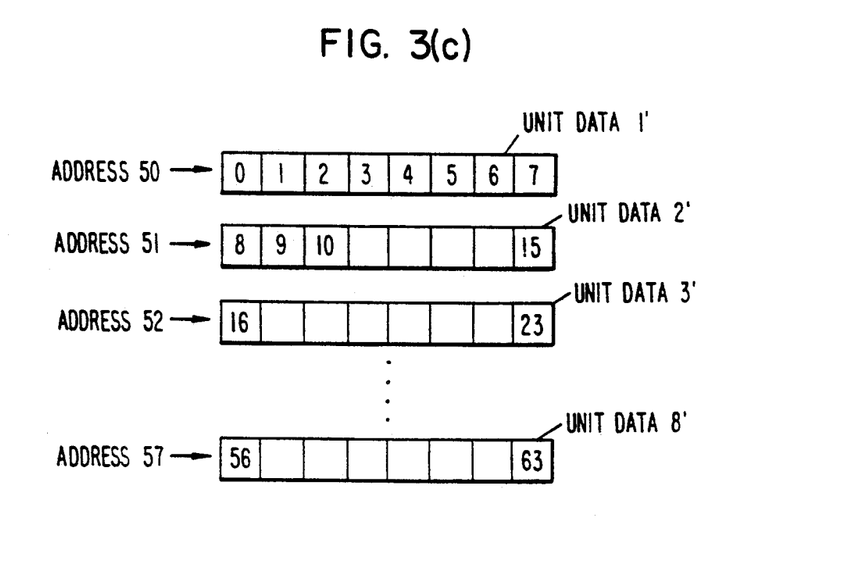

Further, as shown in FIG. 3(c), a reference pattern memory 5 stores, as unit data, the data of plurality of pixels of a character A formign a reference pattern, in the addresses 50 to 57. One address has eight memory areas 5a, and accordingly one address tores eight image data pixels which may be output from the camera 1 as the unit data. The image memory 4 and the reference pattern memory 5 store the data of plurality of pixels (eight pixels in the present embodiment) as the unit data in each of the addresses thereof.

Figure 4A:
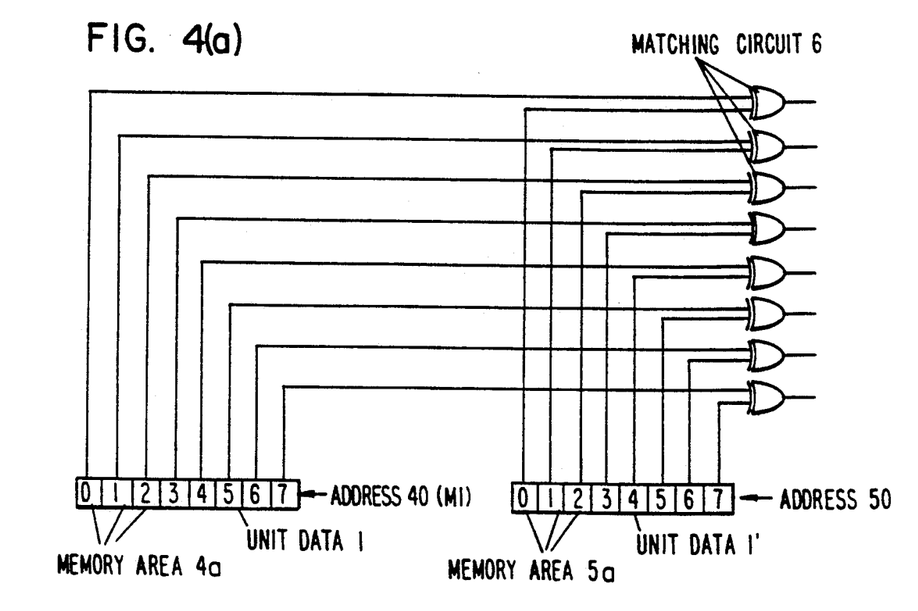
Figure 4B:
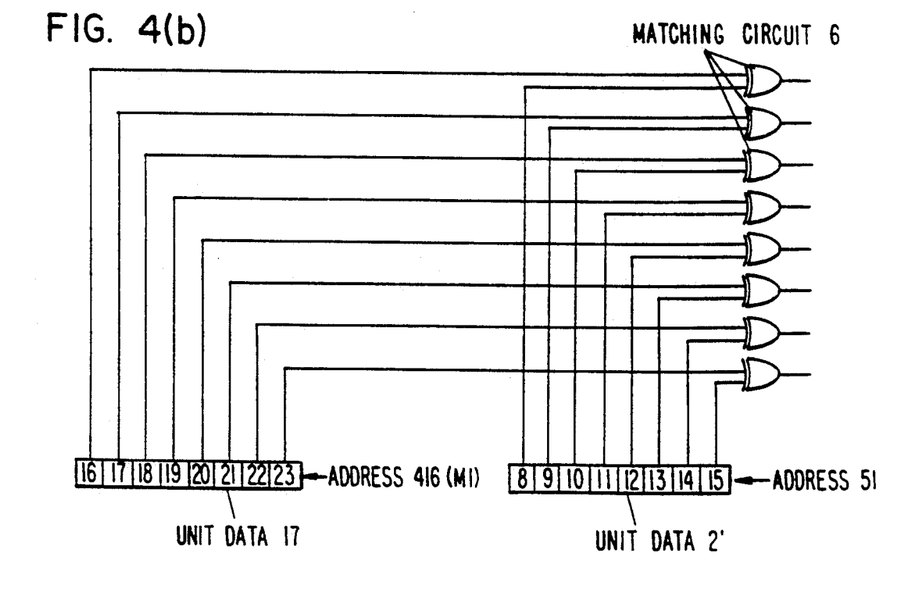

FIGs. 4(a) and 4(b) show the data of the inspection area M1 stored in the image memory 4 and a block diagram for matching the data of the reference pattern memory 5.

As shown in FIG. 2(b), the data of the inspection area M1 are stored in the addresses 40, 416, 432, ..., 4112. As seen in FIG. 4(a), the matching is first performed on the unit data 1 of the first address 40 of the image memory 4 and the unit data 1' of the first address 50 of the reference pattern memory 5. In this illustrative case, the data of eight pixels are matched simultaneously by eight matching circuits 6. Secondly, as seen in FIG. 4(b), the unit data 17 of the eight pixels stored in the second address 416 storing data from area M1 are matched simultaneously with the eight pixels of unit data 2' of the second address 51 of reference pattern memory 5. Similarly, the unit data 17 to 113 (see FIG. 3(b)) of addresses 432 to 4112 (see FIG. 2(b)) are matched with the unit data 3' to 8' of addresses 52 to 57 of the reference pattern memory 5 shown in FIG. 3(c).

By making the matchings eight times all the data 0, 1, 2, ..., 118, 119 of the inspection area M1 are matched. If the matching of the inspection area M1 is completed, other inspection areas M2 to Mn (see FIG. 2(a)) are matched in the same manner as in the inspection area M1. On the other hand, as hereinabove noted, in the prior art the data of the pixels representing the inspection area and the reference pattern memory are matched one-at-a-time. Accordingly, the prior art requires a processing time which is eight times longer than the present invention.

As mentioned above, the inventive instrument stores the data of a plurality of pixels input from the camera in addresses 40 to 4m of the image memory 4 as unit data, as shown in FIG. 3(b). Thus, it is possible to simultaneously match the unit data of the image memory 4 and the unit data of the reference pattern memory 5. This is indicative of the fact that the present instrument can carry out a matching process faster than the prior art by eight times.

The above-mentioned matching may not always be conducted for all the inspection areas M1–Mn. For example, if the matching rate of the inspection area M1 is low, the fact that there is no character A to be detected near the inspection area M1 can be judged. Therefore, offsets (e.g., X offset 4, Y offset 2) are provided in X and Y directions to skip the inspection area M1 to inspection area MS, and may be shifted to addresses 436–4148 (in FIG. 2(b)) Or, some inspection areas Mi may be dispersively set in the image data. Thus these areas Mi may be roughly inspected to detect the areas Mj having high matching rate. The areas Mi may be then densely set near the areas Mj to be inspected. Thus, processing speed of the invention can be further accelerated.

According to the present invention as described above, a pattern matching apparatus comprises camera for observing an object to be detected, an image memory for storing data of a plurality of pixels input to said camera as unit data by deviating or shifting overlapping unit data by one unit pixel in successive addresses, a reference pattern memory for storing data of a plurality of pixels of a reference pattern as unit data in successive addresses, and a matching circuit for simultaneously matching said unit data stored in said image memory to the unit data stored in said reference pattern memory. Therefore, the pattern matching can be performed at a high speed.

What is claimed is:

1. A pattern matching apparatus comprising a camera for observing an object to be detected and providing image data comprising a plurality of pixels arranged vertically and horizontally in a plane, said image data comprising a plurality of overlapping pixel blocks representing successive image inspection areas, each block including a plurality of vertical and horizontal lines of pixels, each horizontal line of pixels forming a unit of image data, said blocks displaced from one another horizontally and vertically in the plane, an image memory for storing in each of a plurality of successive predetermined addresses thereof respective units of image data each having a plurality of pixels input from said camera, a total number of said addresses equal to a total number of horizontal pixel lines of said blocks, said predetermined addresses being divided into address blocks, said image memory storing in different addresses of said image memory units of image data displaced from one another by a number of pixels, wherein said image memory stores a first unit of image data in a first address therein, stores a second unit of image data having a non-overlapping relation with said first unit of image data in a second address therein, and stores in successive addresses between said first and second addresses a sequence of units of image data each having a successively smaller number of pixels overlapping with said first unit of image data, said first unit of image data stored in a first address block representing a first image inspection area, successive units of image data stored in successive address blocks representing successive image inspection areas, a reference pattern memory for storing in each of a plurality of addresses thereof a unit of reference data having a plurality of pixels of a reference pattern, and a matching circuit for simultaneously matching pixels of units of image data from an address block of said image memory to the pixels of units of reference data stored in said reference pattern memory.

2. A pattern matching apparatus according to claim 1, wherein the data of said pixels are binary data.

3. A pattern matching apparatus comprising:

a camera for observing an object to be detected, an image memory for storing at one time plural units of image data in a plurality of addresses thereof, said units of image data each having a plurality of pixels from said camera, said image memory storing said plural units of image data in successive addresses of said image memory by displacing said units of image data from one another by successive numbers of pixels, successive addresses of said image memory including therein overlapping units of image data having a predetermined number of common pixels, a reference pattern memory for storing at one time plural units of reference data in a plurality of addresses thereof, said units of reference data each having a plurality of non-overlapping pixels of a reference pattern, and a matching circuit for simultaneously matching plural pixels of one of said unit image data stored in said image memory to the plural pixels of one of said unit reference data stored in said reference pattern memory, wherein said matching circuit comprises a plurality of logic circuits for matching individual pixels of said unit image data and said unit reference data, the plurality of logic circuits being of the same number as the number of pixels of said unit data.

4. A pattern matching method for an apparatus including an image memory for storing in each of a plurality of addresses thereof a respective unit of image data, each unit of image data having a plurality of pixels of an image from a camera, a reference pattern memory for storing in each of a plurality of addresses thereof a respective unit of reference data, each unit of reference data having a plurality of pixels of a reference pattern, and an arithmetic unit for matching the data stored in said image memory to the data stored in said reference pattern memory to calculate a degree of matching of said both data, the method comprising the steps of:

providing from the camera image data including a plurality of pixels arranged vertically and horizontally in a plane, said image data comprising a plurality of overlapping blocks of pixels representing successive image inspection areas, each block including a plurality of vertical and horizontal lines of pixels, each horizontal line of oixels forming a unit of image data, said blocks displaced from one another horizontally and vertically in the plane, storing successive units of image data in each of a plurality of successive predetermined addresses of said image memory unit, different units of image data displaced from one another by a number of pixels, a total number of said addresses equal to a total number of horizontal pixel lines of said blocks, said storing step comorisinq storinc a first unit of image data in a first address of said image memory, storing a second unit of imace data having a non-overlapping relation with said first unit of image data in a second address therein, and storing in successive addresses between said first and second addresses a sequence of units of image data each having a successively smaller number of pixels overlapping with said first unit of image data, dividing said predetermined addresses into address blocks storing units of image data of respective pixel blocks, said storing step comprising storing a first unit of image data in a first address block, storing successive units of image data in successive adrress blocks, and storing a final unit of image data in a final address block, simultaneously matching pixels of units of image data of the respective addresses of an address block of said image memory to the pixels of units of reference data of the reference pattern memory by a matching circuit, and calculating a degree of matching of the image to the reference pattern by said arithmetic unit.

5. A pattern matching method according to claim 4, wherein said matching step comprises matching successive address blocks of said image memory and includes skipping an address block of said image memory.

6. A pattern matching apparatus as recited in claim 1, further comprising an image register connected for receiving a unit of image data from the camera, said image register connected to provide a sequence of units of image data received from the camera to said image memory for storage therein.

7. A pattern matching apparatus as recited in claim 6, wherein said image memory is further connected to said image register for storing said first unit of image data in said first address therein, for storing said second unit of image data having a non-overlapping relation with said first unit of image data in said second address therein, and for storing in said successive addresses between said first and second addresses said sequence of units of image data each having a successively smaller number of pixels overlapping with said first unit of image data.

8. A pattern matching apparatus as recited in claim 1, wherein each of said sequence of units of image data is displaced by one pixel from a unit of image data in an immediately preceding address of said image memory.

9. A pattern matching apparatus as recited nn claim 3, further comprising an image register connected for receiving a unit of image data from the camera, said image register connected to provide a sequence of units of image data received from the camera to said image memory for storage therein, said image memory further connected to said image register for storing said first unit of image data in said first address therein, for storing said second unit of image data having a non-overlapping relation with said first unit of image data in said second address therein, and for storing in said successive addresses between said first and second addresses said sequence of units of image data having said successively smaller number of pixels overlapping with said first unit of image data.

10. A pattern matching apparatus as recited in claim 3, wherein each of said units of image data is displaced by one pixel from a unit of image data in an immediately preceding address of said image memory.

11. A pattern matching method as recited in claim 4, wherein said step of providing comprises providing from the camera a unit of image data to an image register, and transferring from the image register a sequence of units of image data received from the camera to said image memory for storage therein.

12. A pattern matching method as recited in claim 4, wherein
each unit of image data includes N pixels, where N is an integer greater than zero.

13. A pattern matching method as recited in claim 12, wherein said step of storing a sequence of units of image data each having a successively smaller number of pixels overlapping with said first unit of image data comprises displacing each of said sequence of units of image data by one pixel relative to a unit of image data in an immediately preceding address of said image memory, thereby storing a unit of image data in an address of said image memory having an overlap of $N-1$ pixels with a unit of image data stored in an immediately preceding address.

14. A pattern matching method as recited in claim 12, wherein said step of storing a sequence of units of image data each having a successively smaller number of pixels overlapping with said first unit of image data comprises displacing each of said sequence of units of image data by K pixels relative to a unit of image data in an immediately preceding address of said image memory, where K is an integer greater than zero and less than N, thereby storing a unit of image data in an address of said image memory having an overlap of N-K pixels with a unit of image data stored in an immediately preceding address.

* * * * *